US012759282B2

(12) United States Patent
Ma et al.

(10) Patent No.: US 12,759,282 B2
(45) Date of Patent: Oct. 13, 2026

(54) MULTI-OPTICAL-COLOR OPTICALLY-VARIABLE PRINTING DEVICE AND PRINTING METHOD THEREOF, AND READABLE STORAGE MEDIUM

(71) Applicants: CHINA BANKNOTE PRINTING AND MINTING CORPORATION, Beijing (CN); CHINA BANKNOTE SECURITY PRINTING TECHNOLOGY RESEARCH INSTITUTE CO., LTD., Beijing (CN)

(72) Inventors: Jian Ma, Beijing (CN); Fangjian Li, Beijing (CN); Lisha Guo, Beijing (CN); Pinli Pan, Beijing (CN); Xudong Chen, Beijing (CN); Zhihong Yang, Beijing (CN)

(73) Assignees: CHINA BANKNOTE PRINTING AND MINTING CORPORATION, Beijing (CN); CHINA BANKNOTE SECURITY PRINTING TECHNOLOGY RESEARCH INSTITUTE CO., LTD., Beijing (CN)

( * ) Notice: Subject to any disclaimer, the term of this patent is extended or adjusted under 35 U.S.C. 154(b) by 14 days.

(21) Appl. No.: 18/857,105

(22) PCT Filed: Apr. 21, 2023

(86) PCT No.: PCT/CN2023/089828

§ 371 (c)(1),
(2) Date: Oct. 15, 2024

(87) PCT Pub. No.: WO2023/202708

PCT Pub. Date: Oct. 26, 2023

(65) Prior Publication Data

US 2025/0262851 A1 Aug. 21, 2025

(30) Foreign Application Priority Data

Apr. 22, 2022 (CN) ........................ 202210429178.2

(51) Int. Cl.
*B41F 15/38* (2006.01)
*B05D 3/06* (2006.01)
(Continued)

(52) U.S. Cl.
CPC .............. *B41F 15/38* (2013.01); *B05D 3/067* (2013.01); *B41F 11/02* (2013.01); *B41F 15/12* (2013.01);
(Continued)

(58) Field of Classification Search
None
See application file for complete search history.

(56) References Cited

U.S. PATENT DOCUMENTS

2017/0190197 A1 7/2017 Schaede
2019/0322112 A1 10/2019 Ren
2021/0016560 A1* 1/2021 Kriege .................... B41F 13/08

FOREIGN PATENT DOCUMENTS

CN 102658716 A 9/2012
CN 103407283 A 11/2013
(Continued)

OTHER PUBLICATIONS

International Search Report dated Jun. 23, 2023 received in International Application No. PCT/CN2023/089828.
(Continued)

*Primary Examiner* — Joshua D Zimmerman
(74) *Attorney, Agent, or Firm* — Scully, Scott, Murphy & Presser, P.C.

(57) ABSTRACT

A multi-optical-color optically-variable printing device having: a conveying unit; a screen printing unit, configured to
(Continued)

printing an ink or a varnish containing a magnetic substance on a printing stock; and a plurality of optical-color optically-variable pattern forming units. Each optical-color optically-variable pattern forming unit comprises: magnetizing rollers, magnetic orientation components being arranged on each magnetizing roller and configured to performing magnetic orientation on the printing stock; and pre-drying and curing devices, configured to pre-drying and curing the printing stock, each pre-drying and curing device comprising optical mask curing devices, the optical mask curing device being fixedly arranged and configured to projecting dynamically refreshable variable optical field image-text, and the variable optical field image-text and the printing stock synchronously moving a predetermined distance.

12 Claims, 8 Drawing Sheets

(51) Int. Cl.

| | |
|---|---|
| ***B41F 11/02*** | (2006.01) |
| ***B41F 15/12*** | (2006.01) |
| ***B41F 23/04*** | (2006.01) |
| ***B41F 33/00*** | (2006.01) |
| *B41M 1/12* | (2006.01) |
| *B41M 1/22* | (2006.01) |
| *B41M 7/00* | (2006.01) |

(52) U.S. Cl.

CPC ...... *B41F 23/0453* (2013.01); *B41F 33/0009* (2013.01); *B41M 1/12* (2013.01); *B41M 1/22* (2013.01); *B41M 7/00* (2013.01)

(56) References Cited

FOREIGN PATENT DOCUMENTS

| | | | | | |
|---|---|---|---|---|---|
| CN | 104149508 | A | | 11/2014 | |
| CN | 105149959 | A | | 12/2015 | |
| CN | 105398193 | A | | 3/2016 | |
| CN | 107073929 | A | | 8/2017 | |
| CN | 108594617 | A | | 9/2018 | |
| CN | 108943999 | A | | 12/2018 | |
| CN | 208180497 | U | | 12/2018 | |
| CN | 112976869 | A | | 6/2021 | |
| CN | 113547834 | A | | 10/2021 | |
| CN | 114132052 | A | * | 3/2022 | ............. B41F 13/02 |
| CN | 114801436 | A | | 7/2022 | |
| DE | 102018212427 | A1 | | 1/2020 | |
| EP | 2433798 | A1 | | 3/2012 | |
| EP | 3178569 | A1 | | 6/2017 | |
| JP | 2001-34150 | A | | 2/2001 | |

OTHER PUBLICATIONS

Chinese Office Action dated Dec. 4, 2023 received in Chinese Application No. 202210429178.2.

Chinese Office Action dated Aug. 24, 2023 received in Chinese Application No. 202210429178.2.

Extended European search report dated Mar. 19, 2026 received in European Patent Application No. 23791360.3.

First Office Action dated Mar. 1, 2026 received in Chinese Patent Application No. 202410866726.7.

* cited by examiner

MULTI-OPTICAL-COLOR OPTICALLY-VARIABLE PRINTING DEVICE AND PRINTING METHOD THEREOF, AND READABLE STORAGE MEDIUM

CROSS-REFERENCE TO RELATED APPLICATIONS

This application is a national stage entry of PCT International Application No. PCT/CN2023/089828, filed on Apr. 21, 2023, which claims priority to Chinese Patent Application No. 202210429178.2 filed with China National Intellectual Property Administration on Apr. 22, 2022 and entitled "MULTI-OPTICAL-COLOR OPTICALLY-VARIABLE PRINTING DEVICE AND PRINTING METHOD THEREOF, AND READABLE STORAGE MEDIUM", each of which is incorporated herein by reference in its entirety.

FIELD

The present disclosure relates to the technical field of anti-counterfeiting printing, and particularly relates to a multi-optical-color optically-variable printing device and a printing method thereof, and a readable storage medium.

BACKGROUND

An optical-color optically variable technology refers to a technology that an optically variable magnetic ink (OVMI) is subjected to a silk-screen printing and magnetic orientation process and then a dynamic optically variable phenomenon is generated. Currently, for the same silk-screen printing pattern, worldwide printing apparatuses can only achieve an optical-color optically variable technology with a single effect, that is, a scrolling effect under the effect of a single magnetic field is achieved or a variation effect under the effect of a compound magnetic field is achieved, while there still is not any multi-optical-color optically variable technology that achieves two or more than two effects at the same time.

SUMMARY

The present disclosure aims to solve at least one of the technical problems in the prior art or the related art.

In view of this, the first purpose of the present disclosure is to provide a multi-optical-color optically-variable printing device.

The second purpose of the present disclosure is to provide a multi-optical-color optically-variable printing method.

The third purpose of the present disclosure is to provide a multi-optical-color optically-variable printing device.

The fourth purpose of the present disclosure is to provide a readable storage medium.

In order to achieve the above purposes, the technical solution of the first aspect of the present disclosure provides a multi-optical-color optically-variable printing device, comprising: a conveying unit for conveying a printing stock; a screen printing unit for printing ink or varnish containing a magnetic substance on the printing stock; and a plurality of optical-color optically-variable pattern forming units, and the plurality of optical-color optically-variable pattern forming units are respectively configured to form optical-color optically-variable patterns in different regions of the printing stock; each optical-color optically-variable pattern forming unit comprises: magnetizing rollers, and magnetic orientation components are arranged on each magnetizing roller and configured to perform magnetic orientation on the printing stock; and pre-drying and curing devices for pre-drying and curing the printing stock; and the conveying unit, the screen printing unit and the plurality of optical-color optically-variable pattern forming units are arranged successively in the conveying direction of the printing stock; and the magnetic orientation components of at least two optical-color optically-variable pattern forming units have different magnetization effects from each other, the pre-drying and curing devices are arranged opposite to each other at the outer sides of the magnetic orientation components, and in the process that the magnetic orientation components conduct magnetic orientation to the printing stock, the pre-drying and curing device conducts pre-drying and curing to the printing stock at the same time; and the pre-drying and curing device comprises an optical mask curing device, the optical mask curing device is fixedly arranged and configured to project a dynamically refreshable variable optical field image-text, and the variable optical field image-text and the printing stock synchronously move a predetermined distance.

The multi-optical-color optically-variable printing device provided by the present disclosure comprises the conveying unit, the screen printing unit and the plurality of optical-color optically-variable pattern forming units. The conveying unit is configured to convey the printing stock; the screen printing unit is in the next process of the conveying unit, and configured to imprint an ink or a varnish containing a magnetic substance on the printing stock conveyed by the conveying unit, to form a semi-finished product. The plurality of optical-color optically-variable pattern forming units are in the next process of the screen printing unit, and configured to form an optical-color optically-variable pattern on the semi-finished product. The optical-color optically-variable pattern forming unit comprises the magnetizing roller and the pre-drying and curing device, the magnetic orientation components are arranged on the magnetizing roller and configured to perform magnetic orientation to the printing stock; and the pre-drying and curing devices are configured to pre-dry and curing the printing stock. And the magnetic orientation components of at least two optical-color optically-variable pattern forming units have different magnetization effects from each other, the pre-drying and curing devices are arranged opposite to each other at the outer sides of the magnetic orientation components, and in the process that the magnetic orientation components conduct magnetic orientation to the printing stock, the pre-drying and curing devices conduct pre-drying and curing to the printing stock at the same time. The pre-drying and curing device comprises an optical mask curing device, the optical mask curing device is configured to project a dynamically refreshable variable optical field image-text, and the image-text formed by a variable optical field is irradiated on the printing stock of the magnetizing rollers and synchronously moves with the printing stock, then the ink or the varnish on the printing stock accomplish pre-drying, and thus omnidirectional merging of fixed and variable multi-optical-color optically-variable image-texts can be completed, i.e., merging in any direction. The optical mask curing devices are fixedly arranged. It needs to be indicated that the phrase "fixedly arranged" indicates the fixing of the optical mask curing device during the continuous production process after the product is determined; when product specifications change, the optical mask curing device can be moved along an axial direction of the magnetizing roller to adapt to different product specifications. By setting the magnetic orientation components with different magnetic field effects and the optical mask curing devices that can achieve accurate curing as the pre-drying and curing device, multi-optical-color optically-variable effects can be achieved for multiple regions of the same screen printing pattern, and thus, the omnidirectional merging of multiple fixed effect image-texts is achieved, and the omnidirectional merging of a variable effect image-text and a fixed effect image-text can further be achieved. Multiple effects can be the rolling effects under the action of multiple single magnetic fields, the motion effects under the action of multiple composite magnetic fields, and can further be the rolling effect under the action of single magnetic fields and the motion effects under the action of composite magnetic fields.

When the printing stock moves synchronously with the magnetizing roller, that is, during the continuous magnetization of the printing stock, the optical mask curing device can project a motion image-text of a high refresh rate, a control system collects the position and the speed of the printing stock, a conveying device or the magnetizing roller through a sensor such as a rotary encoder and a grating ruler, and controls the image-text projected by the optical mask curing device to move synchronously with the printing stock, and the mechanical body of the optical mask curing device does not move.

Understandably, due to a principle of forming a certain included angle between an OVMP pigment sheet in the ink and the printing stock, before the pre-curing, curing or natural penetration drying of the OVMP pigment sheet in an OVMI, the magnetic orientation effect to the OVMP pigment sheet is always effective, and therefore, two or multiple magnetic orientations can be conducted during this period, and then a multi-optical-color optically variable technology with more than two effects can be achieved in the same silk-screen printing pattern.

In addition, the technical solution provided by the present disclosure can further comprise the following additional technical features.

In the above technical solution, the multi-optical-color optically-variable printing device comprises a sensor, and the sensor is configured to collect the position information and speed information of the printing stock; the optical mask curing device comprises a light source for emitting light, a controller for receiving the position information and speed information of the sensor and further for receiving, storing and processing image-text data for projection, and generating a control signal based on the position information, the speed information and the image-text data for projection, a lens, and a spatial light modulator for receiving the light emitted by the light source and the control signal to project a variable optical field image-text through the lens; and the spatial light modulator comprises one of a digital micro mirror DMD, a liquid crystal spatial light modulator and an acousto-optical modulator.

In the technical solution, the multi-optical-color optically-variable printing device comprises the sensor, and the sensor is configured to collect the position information and speed information of the printing stock. The optical mask curing device comprises the light source, the controller, the lens and the spatial light modulator. The controller is configured to receive the position information and the speed information of the sensor, and further configured to receive, store and process the image-text data for projection, and generating the control signal based on the position information, the speed information and the image-text data for projection. The spatial light modulator is configured to receive the light emitted by the light source and the control signal, to project a variable optical field image-text through the lens. The spatial light modulator can be a digital micromirror device (DMD), a liquid crystal spatial light modulator (SLM) and an acousto-optical deflector (AOD). Specifically, during the continuous magnetization of the printing stock, the optical mask curing device can project a motion image-text of a high refresh rate, the control system collects the position information and the speed information of the printing stock through the sensor, and controls the image-text projected by the optical mask curing device to move synchronously with the printing stock.

In the above technical solution, the optical mask curing device further comprises a heat dissipation assembly, and the heat dissipation assembly is configured to dissipate heat for the spatial light modulator and/or the light source.

In the technical solution, the optical mask curing device further comprises a heat dissipation assembly, and the heat dissipation assembly is configured to dissipate heat for the spatial light modulator or dissipate heat for the light source.

In the above technical solution, the light source comprises a UV-LED light source or a laser light source, and the wavelength of the light emitted by the light source is 350 nm~425 nm.

In the technical solution, the light source can use a UV-LED light source or a laser light source, and the wavelength of the light emitted by the light source can choose 350 nm~425 nm.

In the above technical solution, the variable optical field image-text comprises one of an image, a character, a serial number, a barcode, a QR code.

In the technical solution, the variable optical field image-text can be an image-text, a character, a serial number, a barcode, and a QR code.

In the above technical solution, the pre-drying and curing device comprises multiple optical mask curing devices, and the multiple optical mask curing devices are arranged at intervals in the axial direction of the magnetizing roller.

In the technical solution, there can be multiple optical mask curing devices, the multiple optical mask curing devices are arranged at intervals in the axial direction of the magnetizing roller, and the optical mask curing devices can be used in combination according to the width size of the printing stock.

In the above technical solution, the pre-drying and curing device further comprises a curing device adjustment mechanism, the curing device adjustment mechanism comprises a fixing beam, a motor and a guide rail, and the fixing beam extends along the axial direction of the magnetizing roller, the optical mask curing device is provided on the fixing beam, and the motor drives the optical mask curing device to move along the fixing beam.

In the technical solution, the pre-drying and curing device further comprises a curing device adjustment mechanism, the curing device adjustment mechanism comprises a fixing beam, a motor and a guide rail, and the fixing beam extends along the long axis direction of the magnetizing roller, the optical mask curing device is provided on the fixing beam, and the motor drives the optical mask curing device to move along the fixing beam, to adjust the spacing distance of the optical mask curing devices.

In the above technical solution, the multi-optical-color optically-variable printing device further comprises a delivery system, and the delivery system comprises multiple conveying rollers, and the delivery system is configured to convey the printing stock.

In the technical solution, the multi-optical-color optically-variable printing device further comprises the delivery system, and the delivery system comprises multiple conveying rollers for successively conveying the printing stock on the conveying unit, the screen printing unit, a plurality of optical-color optically-variable pattern forming units and drying and curing units.

In the above technical solution, the multi-optical-color optically-variable printing device further comprises: a first rearrangement magnetization device, and the first rearrangement magnetization device is provided between the screen printing unit and the optical-color optically-variable pattern forming unit; and a second rearrangement magnetization device, and the second rearrangement magnetization device is provided between multiple optical-color optically-variable patterns.

In the technical solution, the multi-optical-color optically-variable printing device further comprises the first rearrangement magnetization device and the second rearrangement magnetization device. The first rearrangement magnetization device is provided between the screen printing unit and the optical-color optically-variable pattern forming unit, and the second rearrangement magnetization device is provided between multiple optical-color optically-variable patterns. Understandably, after moving from the screen printing unit to the first rearrangement magnetization device, the printing stock enters the optical-color optically-variable pattern forming units, then passes the second rearrangement magnetization device from the first optical-color optically-variable pattern forming unit, and then enters the second optical-color optically-variable pattern forming unit. When ink or varnish is printed on the printing stock, the magnetic pigment sheets therein are arranged in a disorderly and irregular manner; when such a printing stock is conveyed to the first rearrangement magnetization device and the second rearrangement magnetization device, the magnetic pigment sheets are rearranged according to a certain law, for example, they are arranged parallel to the printing stock, and this can improve the consistency of magnetization orientation of the magnetic pigment sheets when they pass the magnetic orientation components, and thus the optical-color optically-variable effect is brighter.

In the above technical solution, the ink or the varnish comprises an optical-color optically-variable ink, a curing gloss oil, or other types of UV curing ink.

In the technical solution, the ink or the varnish can be an optical-color optically-variable ink, a curing gloss oil, or other types of UV curing ink.

In the above technical solution, the printing stock comprises one of paper, a plastic sheet, and a metal sheet.

In the technical solution, the printing stock can be paper, a plastic sheet or a metal sheet.

In the above technical solution, the multi-optical-color optically-variable printing device further comprises a drying and curing unit, and the drying and curing unit is provided on the lower reach of the plurality of optical-color optically-variable pattern forming units, and configured to dry and cure the printing stock.

In the technical solution, the multi-optical-color optically-variable printing device further comprises the drying and curing unit, and the drying and curing unit is provided on the lower reach of the plurality of optical-color optically-variable pattern forming units, and configured to dry and cure the printing stock.

In the above technical solution, the spatial light modulator further comprises a GLV modulator.

In the technical solution, the spatial light modulator further comprises the GLV modulator. The GLV is the abbreviation for Grating Light Valve, and is a technology that can be used for a projector and a switch as well.

The technical solution of the second aspect of the present disclosure provides a multi-optical-color optically-variable printing method, comprising: printing ink or varnish containing a magnetic substance on the printing stock through a screen printing unit, and forming a semi-finished product; conveying the semi-finished product to the plurality of optical-color optically-variable pattern forming units, and conducting pre-drying and curing while conducting magnetization orientation to the semi-finished product by the magnetic orientation components of the optical-color optically-variable pattern forming units and pre-drying and curing devices, to form optical-color optically-variable patterns in different regions of the printing stock and thus form a multi-optically-variable product; and the magnetic orientation components of at least two optical-color optically-variable pattern forming units have different magnetization effects from each other, the pre-drying and curing device comprises an optical mask curing device, the optical mask curing device is fixedly arranged and configured to project a dynamically refreshable variable optical field image-text, and the variable optical field image-text and the printing stock synchronously move a predetermined distance.

According to the multi-optical-color optically-variable printing method provided by the present disclosure, firstly, the semi-finished product is formed by printing the ink or the varnish containing the magnetic substance on the printing stock, and then, the semi-finished product successively passes the plurality of optical-color optically-variable pattern forming units, and is subjected to pre-drying and curing while is subjected to magnetization orientation by the magnetic orientation components and the pre-drying and curing devices, to form the optical-color optically-variable patterns in different regions of the printing stock and thus form the multi-optically-variable product. And the magnetic orientation components of at least two optical-color optically-variable pattern forming units have different magnetization effects from each other, the pre-drying and curing device comprises the optical mask curing device, the optical mask curing device is configured to project a dynamically refreshable variable optical field image-text, and the variable optical field image-text and the printing stock synchronously move, and this achieves twice or multiple times of magnetization positioning and pre-curing and drying to the same screen printing image-text, and thus the omnidirectional merging of fixed and variable multi-optical-color optically-variable image-texts are achieved, i.e., merging in any direction.

In the above technical solution, the multi-optical-color optically-variable printing method further comprises: after successively conveying the semi-finished product to the plurality of optical-color optically-variable pattern forming units, conveying the multi-optically-variable product to a drying and curing unit for drying and curing.

In the technical solution, after the semi-finished product is successively conveyed to the plurality of optical-color optically-variable pattern forming units, the multi-optically-variable product is conveyed to the drying and curing unit for drying and curing, and thus a final product is obtained.

In the above technical solution, the optical mask curing device comprises: a light source for emitting light; a controller for receiving the position information and speed information of the semi-finished product collected by the sensor, and further configured to receive, store and process image-text data for projection, and generating a control signal based on the position information, the speed information and the image-text data for projection; a lens; and a spatial light modulator for receiving the light emitted by the light source and the control signal, to project a variable optical field image-text through the lens; and the spatial light modulator comprises one of a digital micro mirror DMD, a liquid crystal spatial light modulator and an acousto-optical modulator.

In the technical solution, the optical mask curing device comprises the light source, the controller, the lens and the spatial light modulator. The controller is configured to receive the position information and the speed information of the sensor, and further configured to receive, store and process the image-text data for projection, and generate the control signal based on the position information, the speed information and the image-text data for projection. The spatial light modulator is configured to receive the light emitted by the light source and the control signal, to project a variable optical field image-text through the lens. The spatial light modulator can be a digital micromirror device (DMD), a liquid crystal spatial light modulator (SLM), an acousto-optical deflector (AOD) and a GLV modulator. Specifically, during the continuous magnetization of the printing stock, the optical mask curing device can project a motion image-text of a high refresh rate, the control system collects the position information and the speed information of the printing stock through the sensor, and controls the image-text projected by the optical mask curing device to move synchronously with the printing stock.

In order to achieve the third purpose of the present disclosure, the technical solution of the third aspect of the present disclosure provides a multi-optical-color optically-variable printing device, comprising: a storage and a processor, and a program or an instruction which can run in the processor is stored in the storage, and the steps of the multi-optical-color optically-variable printing method in any of the technical solutions of the second aspect are achieved when the processor executes the program or the instruction, and thus, the multi-optical-color optically-variable printing device has the technical effect of any technical solution of the second aspect, which will not be repeated herein.

In order to achieve the fourth purpose of the present disclosure, the technical solution of the fourth aspect of the present disclosure provides a readable storage medium, in which a program or an instruction is stored, when the program or the instruction is executed by a processor, the steps of the multi-optical-color optically-variable printing method in any of the technical solutions of the second aspect are achieved, and thus, the readable storage medium has the technical effect of any technical solution of the second aspect, which will not be repeated herein.

The additional aspects and advantages of the present disclosure will be obvious in the following description, or can be understood through the implementation of the present disclosure.

And the corresponding relationships between the reference signs and the component names in FIG. 1 to FIG. 9 are as follows:

10: multi-optical-color optically-variable printing device, 100: conveying unit, 110: screen printing unit, 130: magnetizing roller, 132: magnetic orientation component, 160: pre-drying and curing device, 210: fixing beam, 220: motor, 230: optical mask curing device, 232: light source, 234: controller, 236: lens, 238: spatial light modulator, 240: heat dissipation assembly, 250: linear guide rail, 280: first rearrangement magnetization device, 290: second rearrangement magnetization device, 370: drying and curing unit, 380: delivery system, 500: printing stock, 300: storage, and 400: processor.

DETAILED DESCRIPTION OF THE DISCLOSURE

To more clearly understand the above purposes, features and advantages of the present disclosure, the present disclosure will be further detailed hereinafter in combination with the accompanying drawings and embodiments. It should be indicated that in the case of no conflict, the embodiments and the features in the embodiments of the present disclosure can be combined with each other.

Many details are illustrated in the following description for the convenience of a thorough understanding to the present disclosure, but the present disclosure can further be implemented using other embodiments other than these described herein. Therefore, the protection scope of the present disclosure is not limited to the specific embodiments disclosed in the following text.

Some embodiments according to the present disclosure are described hereinafter by referring to FIG. 1 to FIG. 9.

Figure 1:
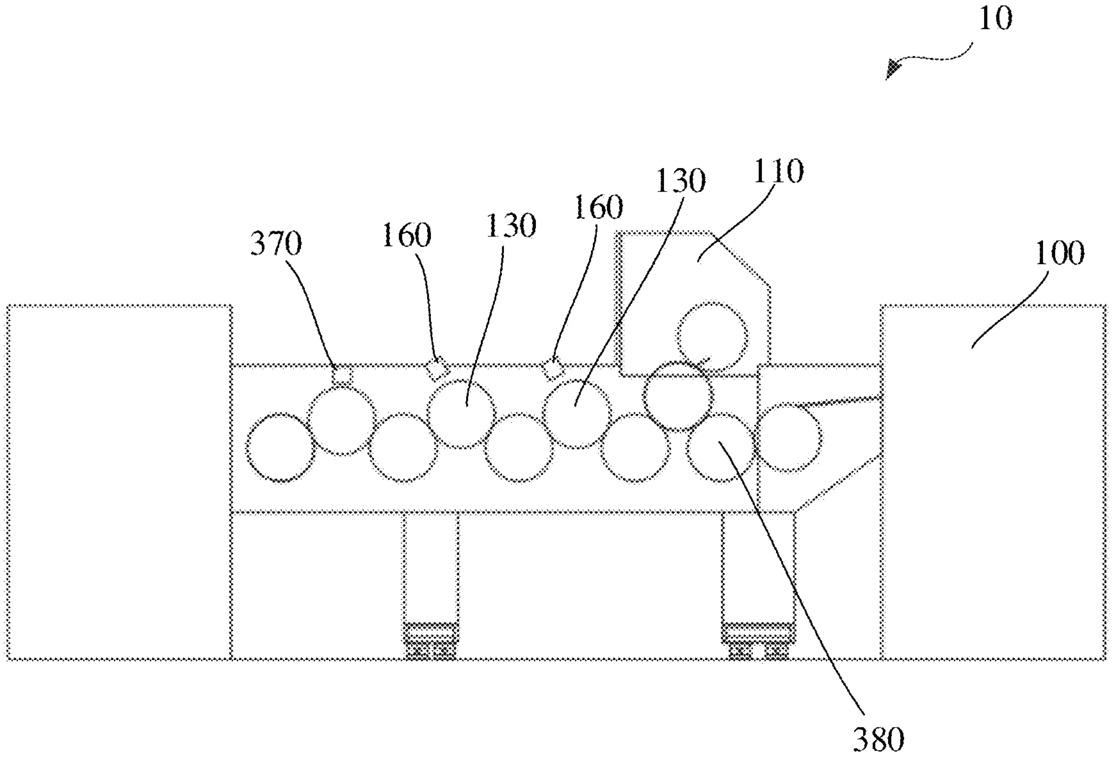
FIG. 1 is a schematic view of the structure of a multi-optical-color optically-variable printing device according to an embodiment of the present disclosure.

As shown in FIG. 1, an embodiment of the present disclosure provides a multi-optical-color optically-variable printing device 10, comprising: a conveying unit 100 for conveying a printing stock 500; a screen printing unit 110 for printing an ink or a varnish containing a magnetic substance on the printing stock 500; and a plurality of optical-color optically-variable pattern forming units, and the plurality of optical-color optically-variable pattern forming units are respectively configured to form optical-color optically-variable patterns in different regions of the printing stock 500; each optical-color optically-variable pattern forming unit comprises: magnetizing rollers 130, and magnetic orientation components 132 are arranged on each magnetizing roller 130 and configured to perform magnetic orientation on the printing stock 500; and pre-drying and curing devices 160 for pre-drying and curing the printing stock 500; and the conveying unit 100, the screen printing unit 110 and the plurality of optical-color optically-variable pattern forming units are arranged successively in the conveying direction of the printing stock 500; and the magnetic orientation components 132 of at least two optical-color optically-variable pattern forming units have different magnetization effects from each other, the pre-drying and curing devices 160 are arranged opposite to each other at the outer sides of the magnetic orientation components 132, and in the process that the magnetic orientation components 132 conduct magnetic orientation to the printing stock 500, the pre-drying and curing device 160 conducts pre-drying and curing to the printing stock 500 at the same time; and the pre-drying and curing device 160 comprises an optical mask curing device 230, the optical mask curing device 230 is fixedly arranged and configured to project a dynamically refreshable variable optical field image-text, and the variable optical field image-text and the printing stock 500 synchronously move a predetermined distance.

The multi-optical-color optically-variable printing device 10 provided by the present disclosure comprises the conveying unit 100, the screen printing unit 110 and the plurality of optical-color optically-variable pattern forming units. The conveying unit 100 is configured to convey the printing stock 500; the screen printing unit 110 is in the next process of the conveying unit 100, and configured to imprint an ink or a varnish containing a magnetic substance on the printing stock 500 conveyed by the conveying unit 100, to form a semi-finished product. The plurality of optical-color optically-variable pattern forming units are in the next process of the screen printing unit 110, and configured to form an optical-color optically-variable pattern on the semi-finished product. The optical-color optically-variable pattern forming unit comprises the magnetizing roller 130 and the pre-drying and curing device 160, the magnetic orientation components 132 are arranged on the magnetizing roller 130 and configured to perform magnetic orientation to the printing stock 500; and the pre-drying and curing devices 160 are configured to pre-dry and cure the printing stock 500. And the magnetic orientation components 132 of at least two optical-color optically-variable pattern forming units have different magnetization effects from each other, the pre-drying and curing devices 160 are arranged opposite to each other at the outer sides of the magnetic orientation components 132, and in the process that the magnetic orientation components 132 conduct magnetic orientation to the printing stock 500, the pre-drying and curing devices 160 conduct pre-drying and curing to the printing stock 500 at the same time. The pre-drying and curing device 160 comprises an optical mask curing device 230, the optical mask curing device 230 is configured to project a dynamically refreshable variable optical field image-text, and the image-text formed by a variable optical field is irradiated on the printing stock 500 of the magnetizing rollers 130 and synchronously moves with the printing stock 500, then the ink or the varnish on the printing stock 500 accomplish pre-drying, and thus omnidirectional merging of fixed and variable multi-optical-color optically-variable image-texts can be completed, i.e., merging in any direction. The optical mask curing devices 230 are fixedly arranged, i.e., the optical mask curing devices 230 is fixed in the continuous production process after the product is determined. It needs to be indicated that the phrase "fixedly arranged" indicates the fixing of the optical mask curing device 230 during the continuous production process after the product is determined; when product specifications change, the optical mask curing device 230 can be moved along an axial direction of the magnetizing roller 130 to adapt to different product specifications. By setting the magnetic orientation components 132 with different magnetic field effects and the optical mask curing devices 230 that can achieve accurate curing as the pre-drying and curing device 160, multi-optical-color optically-variable effects can be achieved for multiple regions of the same screen printing pattern, and thus, the omnidirectional merging of multiple fixed effect image-texts is achieved, and the omnidirectional merging of a variable effect image-text and a fixed effect image-text can further be achieved. Multiple effects can be the rolling effects under the action of multiple single magnetic fields, the motion effects under the action of multiple composite magnetic fields, and can further be the rolling effect under the action of single magnetic fields and the motion effects under the action of composite magnetic fields. And the ink or the varnish comprises an optical-color optically-variable ink, a curing gloss oil, or other types of UV curing ink. The printing stock 500 can be paper, a plastic sheet or a metal sheet.

Specifically, when the printing stock 500 moves synchronously with the magnetizing roller 130, that is, during the continuous magnetization of the printing stock 500, the optical mask curing device 230 can project a motion image-text of a high refresh rate, a control system collects the position and the speed of the printing stock 500, a conveying device or the magnetizing roller 130 through a sensor such as a rotary encoder and a grating ruler, and controls the image-text projected by the optical mask curing device 230 to move synchronously with the printing stock 500, and the mechanical body of the optical mask curing device 230 does not move.

Understandably, due to a principle of forming a certain included angle between an OVMP pigment sheet in the ink and the printing stock, before the pre-curing, curing or natural penetration drying of the OVMP pigment sheet in an OVMI, the magnetic orientation effect to the OVMP pigment sheet is always effective, and therefore, two or multiple magnetic orientations can be conducted during this period, and then a multi-optical-color optically variable technology with more than two effects can be achieved in the same silk-screen printing pattern.

Figure 5:
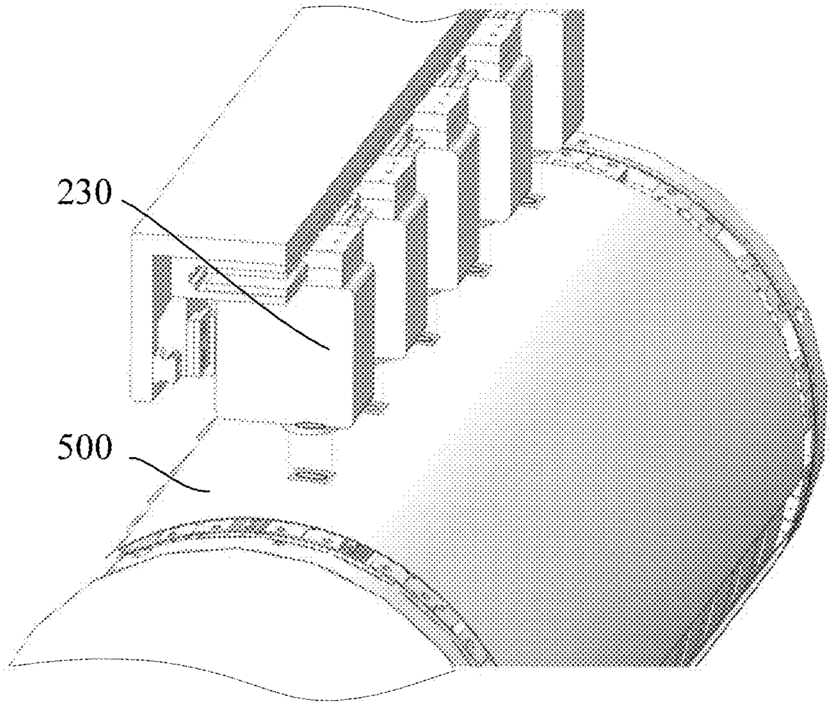
FIG. 5 is a schematic view of a local structure of a multi-optical-color optically-variable printing device according to an embodiment of the present disclosure.
Figure 6:
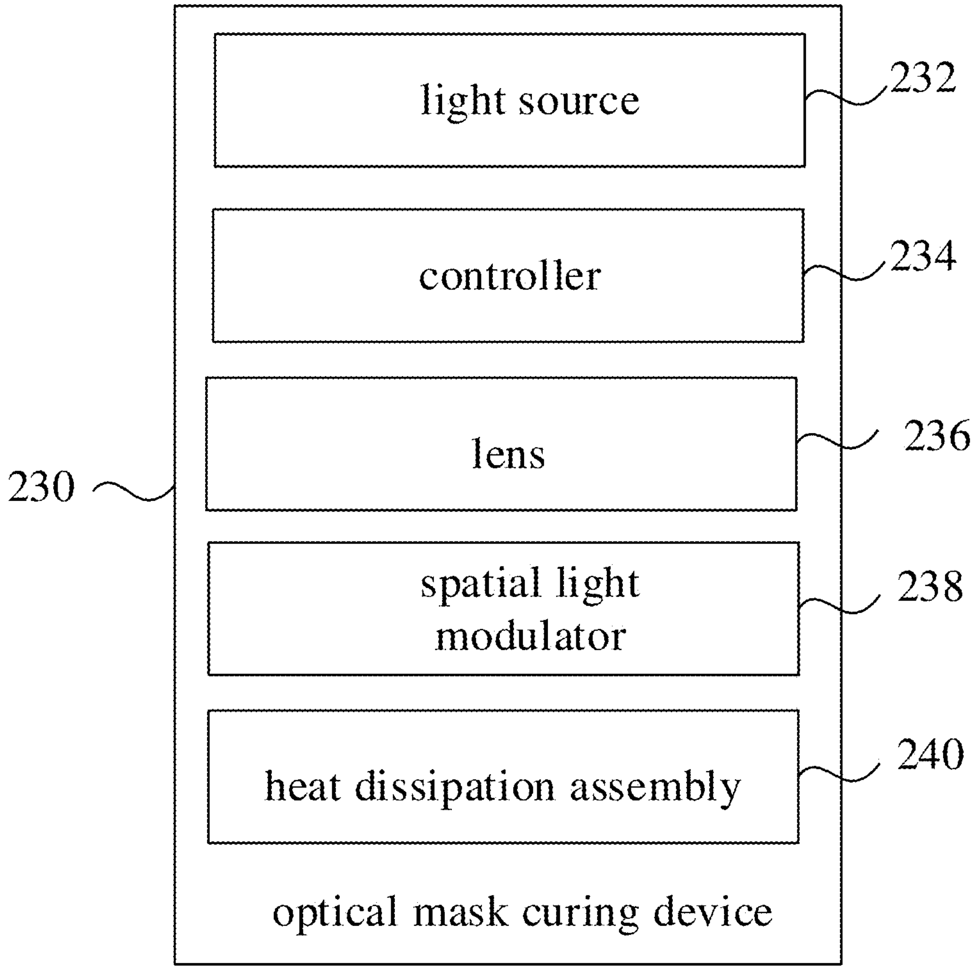
FIG. 6 is a schematic block diagram of the structure of an optical mask curing device according to an embodiment of the present disclosure.

As shown in FIG. 5 and FIG. 6, furthermore, the multi-optical-color optically-variable printing device 10 comprises the sensor, and the sensor is configured to collect the position information and speed information of the printing stock 500. The optical mask curing device 230 comprises the light source 232, the controller 234, the lens 236 and the spatial light modulator 238. The controller 234 is configured to receive the position information and the speed information of the sensor, and further configured to receive, store and process the image-text data for projection, and generate the control signal based on the position information, the speed information and the image-text data for projection. The spatial light modulator 238 is configured to receive the light emitted by the light source 232 and the control signal, to project a variable optical field image-text through the lens 236. The spatial light modulator 238 can be a digital micromirror device (DMD), a liquid crystal spatial light modulator (SLM) or an acousto-optical deflector (AOD) and a GLV modulator. And DMD is the abbreviation of a digital micromirror device, SLM is the abbreviation of a spatial light modulator, AOD is the abbreviation of an acousto-optical deflector, and GLV is the abbreviation of a grating light valve. Specifically, during the continuous magnetization of the printing stock 500, the optical mask curing device

230 can project a motion image-text of a high refresh rate, the control system collects the position information and the speed information of the printing stock 500 through the sensor, and controls the image-text projected by the optical mask curing device 230 to move synchronously with the printing stock 500. The synchronous projection control method for the optical mask curing device 230 solves the problem of the continuous production of the printing stock 500, that is, the printing stock 500 completes the magnetization orientation and accurate solidification of patterns during a continuous high-speed movement, and this can accurately align the projected image-text with the existing printing patterns of the printing stock 500.

Furthermore, the optical mask curing device 230 further comprises a heat dissipation assembly 240. The heat dissipation assembly 240 is configured to dissipate heat for the spatial light modulator 238 or dissipating heat for the light source 232.

Specifically, there can be multiple optical mask curing devices 230, the multiple optical mask curing devices 230 are arranged at intervals in the axial direction of the magnetizing roller 130, and the optical mask curing devices 230 can be used in combination according to the width size of the printing stock 500.

In the above embodiment, the variable image-text can be an image-text, a character, a serial number, a barcode, and a QR code.

Figure 2:
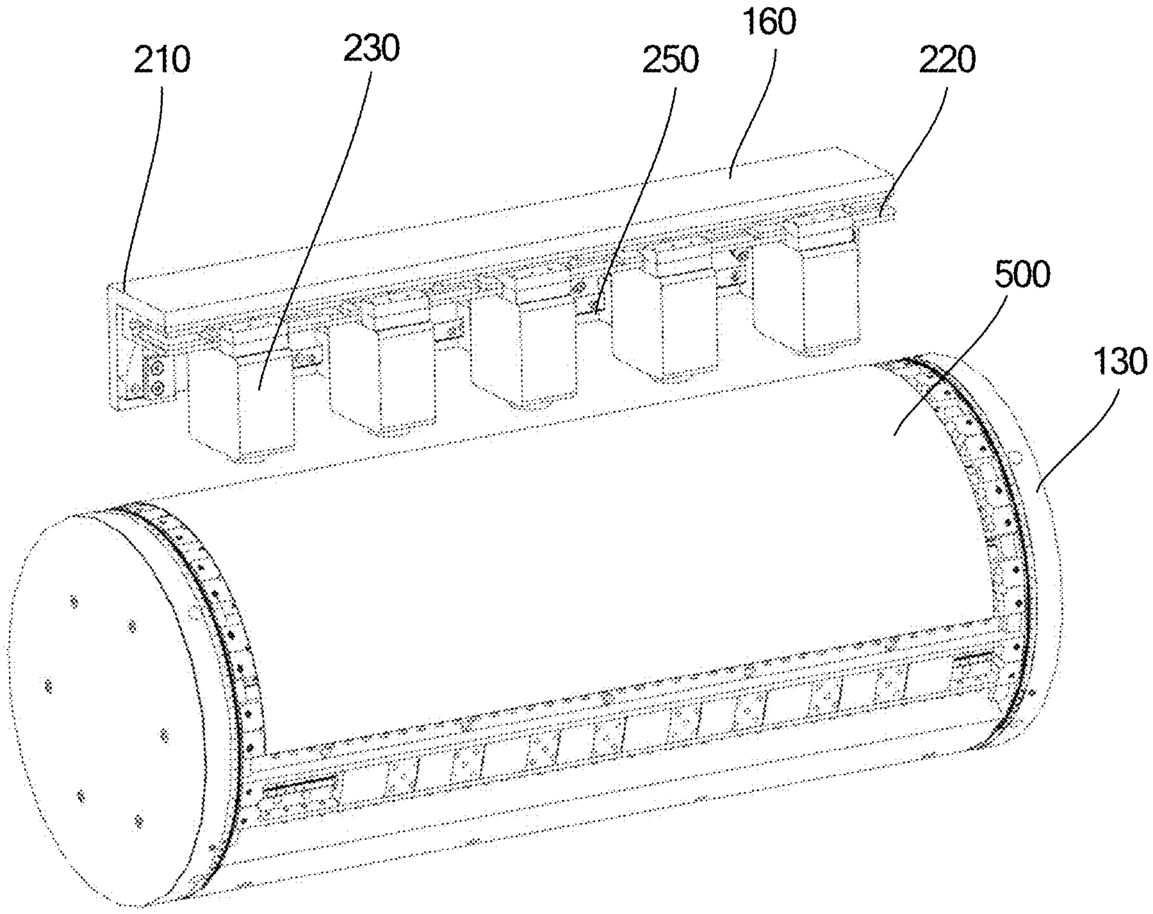
FIG. 2 is a schematic view of a local structure of a multi-optical-color optically-variable printing device according to an embodiment of the present disclosure.
Figure 3:
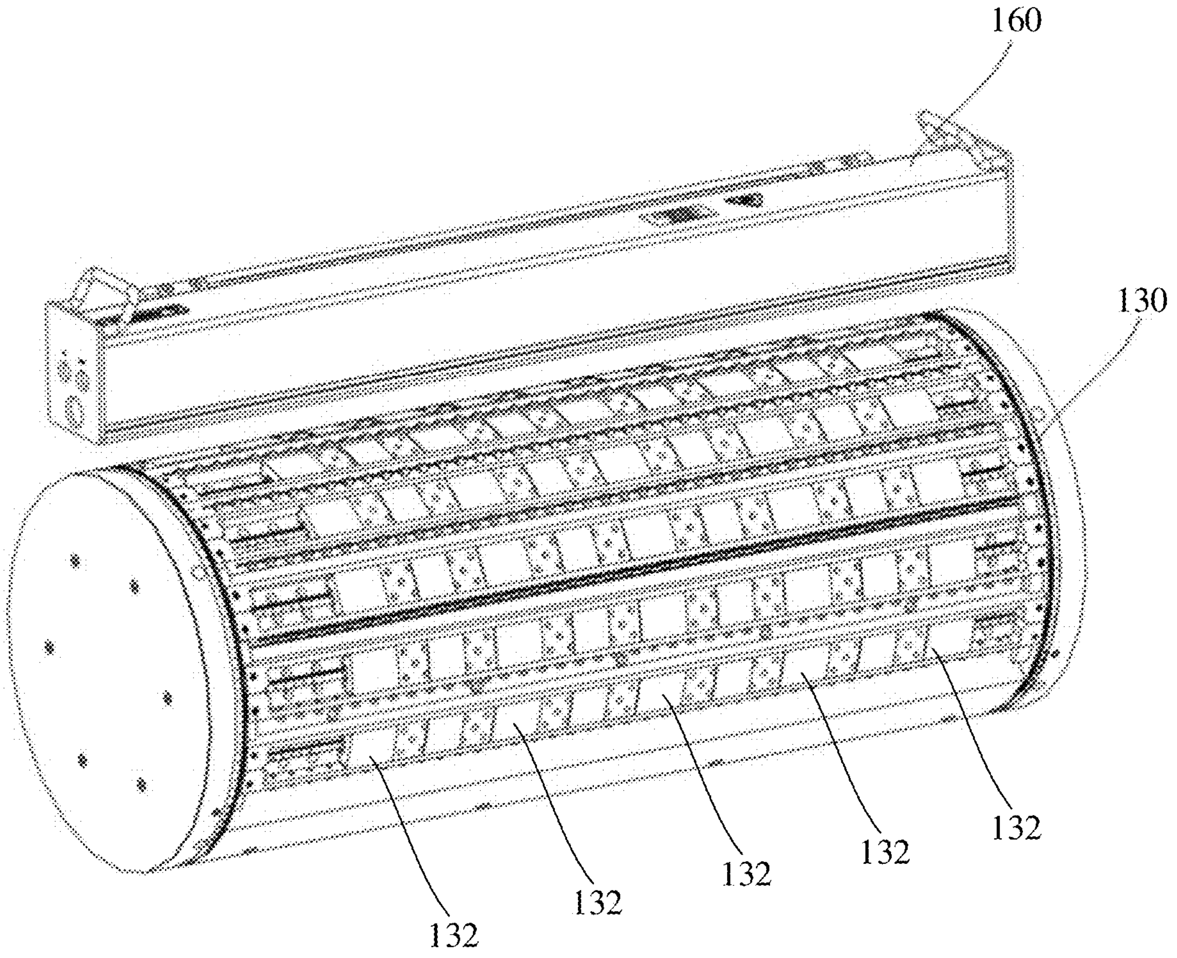
FIG. 3 is a schematic view of a local structure of a multi-optical-color optically-variable printing device according to an embodiment of the present disclosure.

As shown in FIG. 2 and FIG. 3, in the above embodiment, the pre-drying and curing device 160 further comprises a curing device adjustment mechanism, the curing device adjustment mechanism comprises a fixing beam 210, a motor 220 and a guide rail, and the fixing beam 210 extends along the long axis direction of the magnetizing roller 130, the optical mask curing device 230 is provided on the fixing beam 210, and the motor 220 drives the optical mask curing device 230 to move along the fixing beam 210, to adjust the spacing distance of the optical mask curing devices 230. The fixing beam 210 comprises a horizontal plate and a vertical plate, the horizontal plate and the vertical plate are connected to each other, and the motor 220 is provided on the horizontal plate. The guide rail comprises a linear guide rail 250 and a curing device guide rail, the linear guide rail 250 is located on the horizontal plate, and the curing device guide rail is located on the vertical plate; multiple optical mask curing devices 230 are respectively connected to the linear guide rail 250, and they can move on the fixing beam 210.

In the above embodiment, the multi-optical-color optically-variable printing device 10 further comprises the delivery system 380, and the delivery system 380 comprises multiple conveying rollers for successively conveying the printing stock 500 on the conveying unit 100, the screen printing unit 110, a plurality of optical-color optically-variable pattern forming units and drying and curing units 370.

Figure 4:
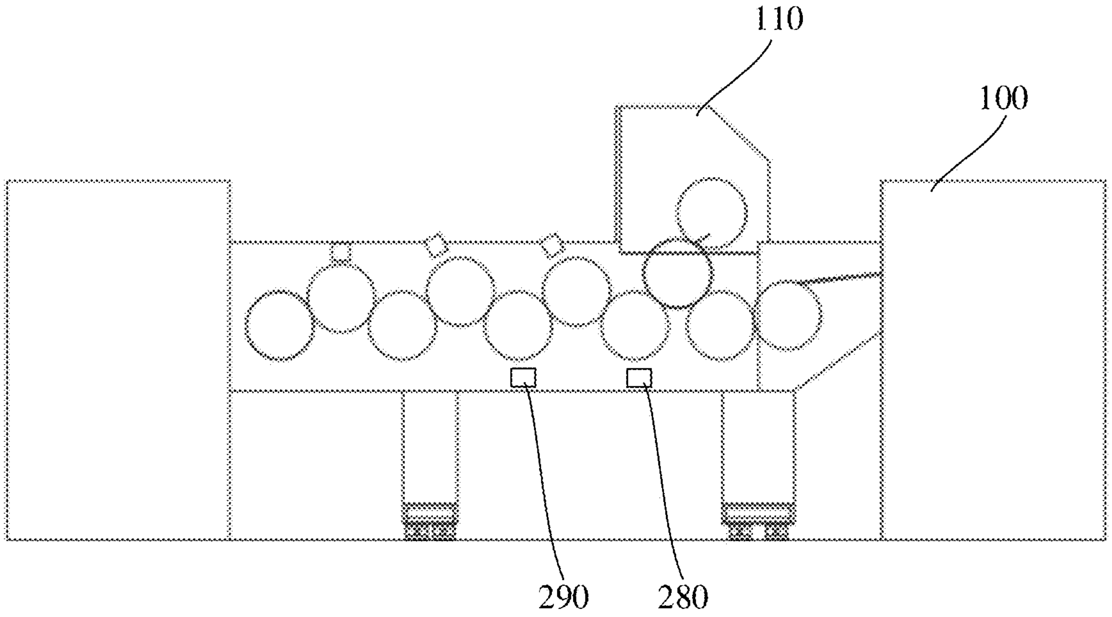
FIG. 4 is a schematic view of a local structure of a multi-optical-color optically-variable printing device according to an embodiment of the present disclosure.

As shown in FIG. 4, in some embodiments, the multi-optical-color optically-variable printing device 10 further comprises the first rearrangement magnetization device 280 and the second rearrangement magnetization device 290. The first rearrangement magnetization device 280 is provided between the screen printing unit 110 and the optical-color optically-variable pattern forming unit, and the second rearrangement magnetization device 290 is provided between multiple optical-color optically-variable patterns. Understandably, after moving from the screen printing unit 110 to the first rearrangement magnetization device 280, the printing stock 500 enters the optical-color optically-variable pattern forming units, then passes the second rearrangement magnetization device 290 from the first optical-color optically-variable pattern forming unit, and then enters the second optical-color optically-variable pattern forming unit. When ink or varnish is printed on the printing stock 500, the magnetic pigment sheets therein are arranged in a disorderly and irregular manner; when such a printing stock 500 is conveyed to the first rearrangement magnetization device 280 and the second rearrangement magnetization device 290, the magnetic pigment sheets are rearranged according to a certain law, for example, they are arranged parallel to the printing stock 500, and this can improve the consistency of magnetization orientation of the magnetic pigment sheets when they pass the magnetizing roller 130, and thus the optical-color optically-variable effect is brighter.

In the above embodiment, the multi-optical-color optically-variable printing device 10 further comprises a drying and curing unit 370, and the drying and curing unit 370 is provided on the lower reach of the plurality of optical-color optically-variable pattern forming units, and configured to dry and cure the printing stock 500.

Figure 8:
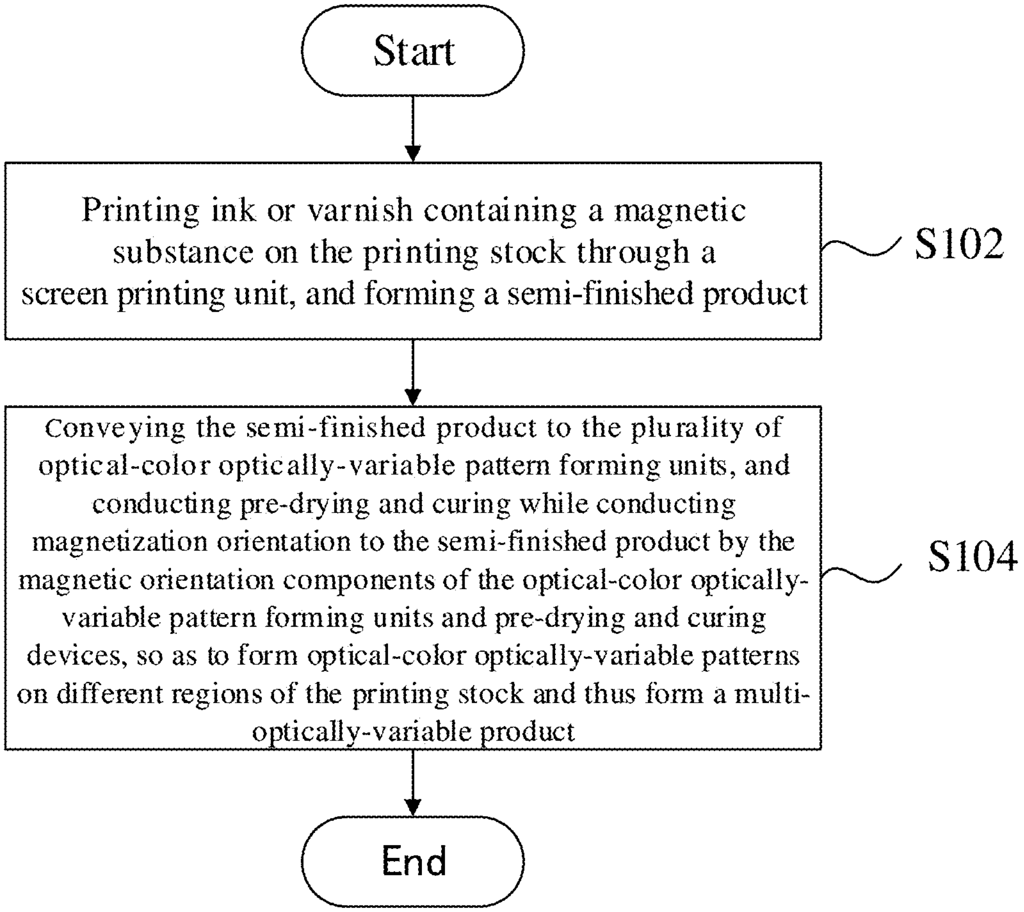
FIG. 8 is a flow chart of the steps of a multi-optical-color optically-variable printing method according to an embodiment of the present disclosure.

As shown in FIG. 8, the embodiment of the second aspect of the present disclosure provides a multi-optical-color optically-variable printing method, comprising:

S102: printing ink or varnish containing a magnetic substance on the printing stock through a screen printing unit, and forming a semi-finished product;

S104: conveying the semi-finished product to the plurality of optical-color optically-variable pattern forming units, and conducting pre-drying and curing while conducting magnetization orientation to the semi-finished product by the magnetic orientation components of the optical-color optically-variable pattern forming units and pre-drying and curing devices, to form optical-color optically-variable patterns in different regions of the printing stock and thus form a multi-optically-variable product;

And the magnetic orientation components of at least two optical-color optically-variable pattern forming units have different magnetization effects from each other, the pre-drying and curing device comprises an optical mask curing device, the optical mask curing device is fixedly arranged and configured to project a dynamically refreshable variable optical field image-text, and the variable optical field image-text and the printing stock synchronously move a predetermined distance.

In the embodiment, firstly, the semi-finished product is formed by printing the ink or the varnish containing the magnetic substance on the printing stock, and then, the semi-finished product successively passes the plurality of optical-color optically-variable pattern forming units, and is subjected to pre-drying and curing while is subjected to magnetization orientation by the magnetic orientation components and the pre-drying and curing devices, to form the optical-color optically-variable patterns in different regions of the printing stock and thus form the multi-optically-variable product. And the magnetic orientation components of at least two optical-color optically-variable pattern forming units have different magnetization effects from each other, the pre-drying and curing device comprises the optical mask curing device, the optical mask curing device is configured to project a dynamically refreshable variable optical field image-text, and the variable optical field image-text and the printing stock synchronously move, and this achieves twice or multiple times of magnetization positioning and pre-curing and drying to the same screen printing image-text, and thus the omnidirectional merging of fixed and variable multi-optical-color optically-variable image-texts are achieved, i.e., merging in any direction.

Figure 9:
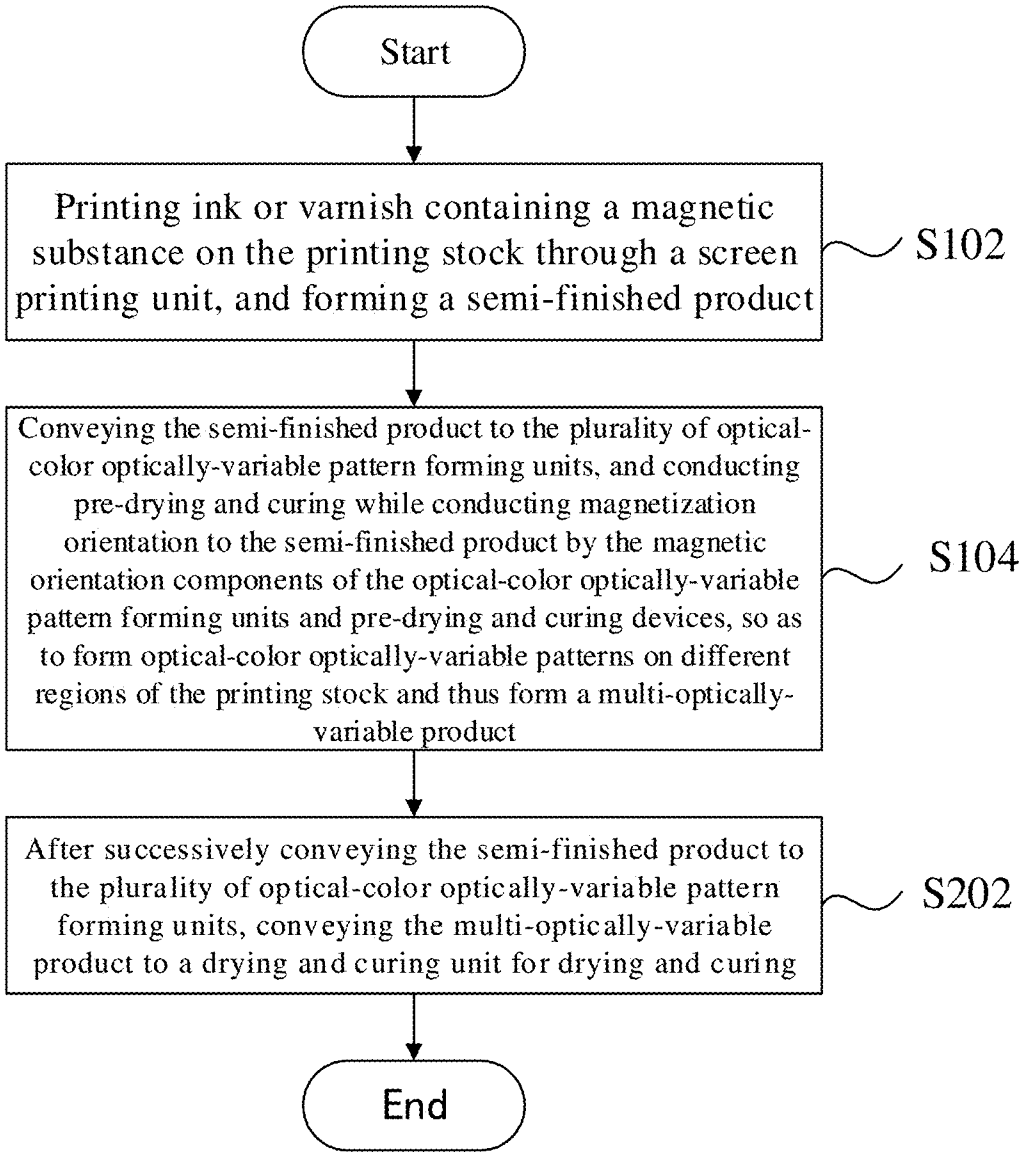
FIG. 9 is a flow chart of the steps of a multi-optical-color optically-variable printing method according to an embodiment of the present disclosure.

As shown in FIG. 9, the multi-optical-color optically-variable printing method provided by the above embodiment further comprises the following steps:

S202: after successively conveying the semi-finished product to the plurality of optical-color optically-variable pattern forming units, conveying the multi-optically-variable product to a drying and curing unit for drying and curing.

In the embodiment, after the semi-finished product is successively conveyed to the plurality of optical-color optically-variable pattern forming units, the multi-optically-variable product is conveyed to the drying and curing unit for drying and curing, and thus a final product is obtained.

In the embodiment, the optical mask curing device comprises the light source, the controller, the lens and the spatial light modulator. The controller is configured to receive the position information and the speed information of the sensor, and further configured to receive, store and process the image-text data for projection, and generating the control signal based on the position information, the speed information and the image-text data for projection. The spatial light modulator is configured to receive the light emitted by the light source and the control signal, to project a variable optical field image-text through the lens. The spatial light modulator can be a digital micromirror device (DMD), a liquid crystal spatial light modulator (SLM), an acousto-optical deflector (AOD) and a GLV modulator. Specifically, during the continuous magnetization of the printing stock, the optical mask curing device can project a motion image-text of a high refresh rate, the control system collects the position information and the speed information of the printing stock through the sensor, and controls the image-text projected by the optical mask curing device to move synchronously with the printing stock. The synchronous projection control method for the optical mask curing device solves the problem of the continuous production of the printing stock, that is, the printing stock completes the magnetization orientation and accurate solidification of patterns during a continuous high-speed movement, and this can accurately align the projected image-text with the existing printing patterns of the printing stock.

Figure 7:
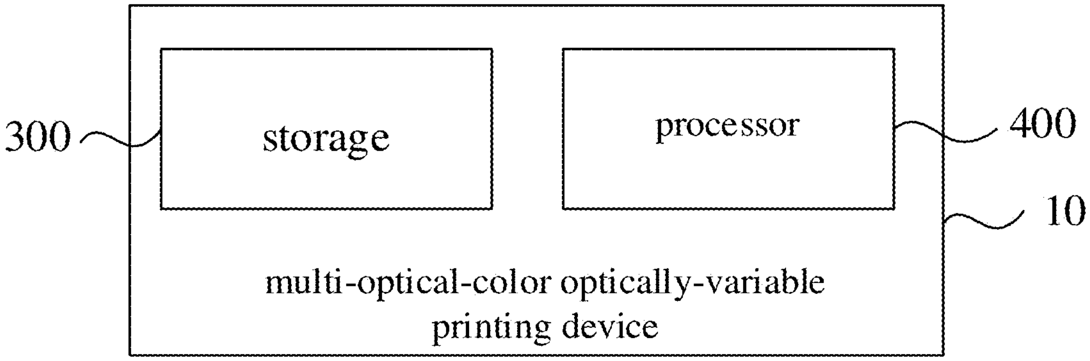
FIG. 7 is a schematic block diagram of the structure of a multi-optical-color optically-variable printing device according to an embodiment of the present disclosure.

As shown in FIG. 7, the embodiment of the third aspect of the present disclosure provides a multi-optical-color optically-variable printing device 10, comprising: a storage 300 and a processor 400, and a program or an instruction which can run in the processor 400 is stored in the storage 300, and the steps of the multi-optical-color optically-variable printing method in any of the technical solutions of the second aspect are achieved when the processor 400 executes the program or the instruction, and thus, the multi-optical-color optically-variable printing device has the technical effect of any technical solution of the second aspect, which will not be repeated herein.

The embodiment of the fourth aspect of the present disclosure provides a readable storage medium, in which a program or an instruction is stored, when the program or the instruction is executed by a processor, the steps of the multi-optical-color optically-variable printing method in any of the technical solutions of the second aspect are achieved, and thus, the readable storage medium has the technical effect of any technical solution of the second aspect, which will not be repeated herein.

As shown in FIG. 1 to FIG. 9, the multi-optical-color optically-variable printing device 10 provided by a specific embodiment in the present disclosure comprises the conveying unit 100, the screen printing unit 110, the magnetizing roller 130, the magnetic orientation component 132, the pre-drying and curing device 160 and the optical mask curing device 230. And a sheet-like substrate is conveyed to the screen printing unit 110 through the conveying unit 100, and an ink or varnish carrier is imprinted onto the sheet-like substrate through screen printing to form the printing stock 500. The printing stock is conveyed to the magnetizing roller 130 through a delivery roller, the ink or varnish carrier on the printing stock 500 is magnetized and positioned, and at the same time, through the pattern formed by the variable optical field emitted by the optical mask curing device 230 of the pre-drying and curing device 160 opposite to the magnetizing roller 130, accurate and variable pre-drying and curing can be conducted to a portion of the magnetized ink or varnish carrier. In order to increase the time of the pre-drying and curing, the image-text of the variable optical field needs to move synchronously with the printing stock 500. Since the pre-drying and curing device 160 is fixed, the pattern needs to be able to move within a projection area. Due to the limitation of the projection area, the image-text of the variable optical field can initially have a partial shape, then a complete shape and then a partial shape along with a rotation direction. After subjected to twice or multiple times of magnetizations and pre-drying and curing, the printing stock is conveyed to the drying and curing unit 370 through the delivery roller for drying and curing to form a printed material.

To sum up, the beneficial effects of the embodiments of the present disclosure are as follows:

1, two or more sets of magnetizing rollers and the pre-drying and curing devices are connected in series, and this structure can achieve twice or multiple times of magnetizing and positioning, and pre-curing and drying for the same silk screen printing image-text;

2, through the accurate variable pre-drying technology, a specially designed pre-drying and curing device with an optical mask curing device can emit the variable optical field, and the image-text formed by the variable optical field are irradiated onto the printing stock on the magnetizing roller, and the pre-drying of the ink or the varnish on the printing stock is completed;

3, by a dual-optical-color optically-variable image-text merging technology, two suitable magnetic field generation devices are designed, and the omnidirectional merging of fixed and variable dual-optical-color optically-variable image-texts is completed;

4, the fixed image-text can be a circular shape, a rectangular shape, or an oblique line; and the variable image-text can be any other image-text such as a serial number, a barcode, a QR code;

5, the variable optical field emitted by the pre-drying and curing device is high dynamic refreshable, the refresh rate of the variable optical field can match the speed of the magnetizing roller, and the image-text irradiated on the printing stock can move synchronously with the printing stock to increase the curing time; and 6, the light source of the optical mask curing device can use an LED light source and a laser light source.

The above is a detailed description to the technical solutions of the present disclosure in combination with the accompanying drawings, and through the technical solutions of the present disclosure, multiple effects of the multi-optical-color optically-variable technology are achieved for the same screen printing pattern, and the omnidirectional merging technology for multiple effect patterns is achieved.

The methodologies described herein may be implemented by various means depending upon applications according to particular features and/or examples. For example, such methodologies may be implemented in hardware, firmware, and/or combinations thereof, along with software. In a hardware implementation, for example, a processor may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, other devices units designed to perform the functions described herein, and/or combinations thereof.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media, or electrical signals transmitted through a wire.

In the present disclosure, the terms "first" and "second" are used for the purpose of description only, and cannot be understood to indicate or imply relative importance; the term of "multiple" refers to two or more, unless otherwise explicitly specified or defined. The terms of "mounting", "connected to", "connected with", "fix" and the like should be understood in a broad sense, for example, the term "connected with" can be a fixed connection, a detachable connection, or an integral connection; the term "connected to" can be a direct connection or an indirect connection through an intermediate medium. For a person skilled in the art, they may understand the specific meanings of the above-mentioned terms in the present disclosure according to specific circumstances.

In the description of the present disclosure, the descriptions of "one embodiment", "some embodiments" and "specific embodiments" and the like mean that specific features, structures, materials or characteristics described in combination with the embodiment(s) or example(s) are included in at least one embodiment or example of the present disclosure. In the specification, the schematic representation of the above terms does not necessarily refer to the same embodiment or example. Moreover, the described particular features, structures, materials or characteristics may be combined in a suitable manner in any one or more embodiments or examples.

The descriptions above are only some embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A multi-optical-color optically-variable printing device, comprising:

a conveying unit for conveying a printing stock;

a screen printing unit for printing ink or varnish containing a magnetic substance on the printing stock; and a plurality of optical-color optically-variable pattern forming units, wherein the plurality of optical-color optically-variable pattern forming units are respectively configured to form optical-color optically-variable patterns on different regions of the printing stock; each optical-color optically-variable pattern forming unit comprises:

magnetizing rollers, wherein magnetic orientation components are arranged on each magnetizing roller and configured to perform magnetic orientation on the printing stock; and pre-drying and curing devices for pre-drying and curing the printing stock;

wherein the conveying unit, the screen printing unit and the plurality of optical-color optically-variable pattern forming units are arranged successively in the conveying direction of the printing stock;

wherein the magnetic orientation components of at least two optical-color optically-variable pattern forming units have different magnetization effects from each other, the pre-drying and curing devices are arranged opposite to each other at the outer sides of the magnetic orientation components, and in the process that the magnetic orientation components conduct magnetic orientation to the printing stock, the pre-drying and curing device conducts pre-drying and curing to the printing stock at the same time;

wherein the pre-drying and curing device comprises an optical mask curing device, the optical mask curing device is fixedly arranged and configured to project a dynamically refreshable variable optical field image-text, and the variable optical field image-text and the printing stock synchronously move a predetermined distance;

wherein the multi-optical-color optically-variable printing device comprises a sensor, and the sensor is configured to collect the position information and speed information of the printing stock; and wherein the multi-optical-color optically-variable printing device further comprises:

a first rearrangement magnetization device, wherein the first rearrangement magnetization device is provided between the screen printing unit and the optical-color optically-variable pattern forming unit; and a second rearrangement magnetization device, wherein the second rearrangement magnetization device is provided between multiple optical-color optically-variable pattern forming units, wherein when ink or varnish is printed on the printing stock, the magnetic pigment sheets therein are arranged in a disorderly and irregular manner, and when the printing stock is conveyed to the first rearrangement magnetization device and the second rearrangement magnetization device, magnetic pigment sheets in the ink or varnish containing a magnetic substance are rearranged parallel to the printing stock;

wherein the pre-drying and curing device further comprises:

a curing device adjustment mechanism, wherein the curing device adjustment mechanism comprises a fixing beam, a motor and a guide rail, and the fixing beam extends along the axial direction of the magnetizing roller, the optical mask curing device is provided on the fixing beam, and the motor drives the optical mask curing device to move along the fixing beam;

the fixing beam comprises a horizontal plate and a vertical plate, the horizontal plate and the vertical plate are connected to each other, and the motor is provided on the horizontal plate; the guide rail comprises a linear guide rail and a curing device guide rail, the linear guide rail is located on the horizontal plate, and the curing device guide rail is located on the vertical plate; multiple optical mask curing devices are respectively connected to the linear guide rail, and they can move on the fixing beam;

the optical mask curing device comprises:

a light source for emitting light;

a controller for receiving the position information and the speed information of the sensor and further for receiving, storing and processing image-text data for projection, and generating a control signal based on the position information, the speed information and the image-text data for projection;

a lens; and a spatial light modulator for receiving the light emitted by the light source and the control signal to project the variable optical field image-text through the lens.

2. The multi-optical-color optically-variable printing device according to claim 1, wherein, the spatial light modulator comprises one of a digital micro mirror DMD, a liquid crystal spatial light modulator and an acousto-optical modulator.

3. The multi-optical-color optically-variable printing device according to claim 2, wherein, the optical mask curing device further comprises a heat dissipation assembly and the heat dissipation assembly is configured to dissipate heat for the spatial light modulator and/or the light source.

4. The multi-optical-color optically-variable printing device according to claim 3, wherein, the light source comprises a UV-LED light source or a laser light source, and the wavelength of the light emitted by the light source is 350 nm~425 nm.

5. The multi-optical-color optically-variable printing device according to claim 4, wherein, the variable optical field image-text comprises one of an image, a character, a serial number, a barcode, and a QR code.

6. The multi-optical-color optically-variable printing device according to claim 1, wherein, the pre-drying and curing device comprises multiple optical mask curing devices, and the multiple optical mask curing devices are arranged at intervals in the axial direction of the magnetizing roller.

7. The multi-optical-color optically-variable printing device according to claim 1, wherein, the multi-optical-color optically-variable printing device further comprises:

a delivery system, and the delivery system comprises multiple conveying rollers, and the delivery system is configured to convey the printing stock.

8. The multi-optical-color optically-variable printing device according to claim 1, wherein, the ink or the varnish comprises an optical-color optically-variable ink, a curing gloss oil, or other types of UV curing ink.

9. The multi-optical-color optically-variable printing device according to claim 1, wherein, the printing stock comprises one of paper, a plastic sheet, and a metal sheet.

10. The multi-optical-color optically-variable printing device according to claim 1, wherein, the multi-optical-color optically-variable printing device further comprises a drying and curing unit, and the drying and curing unit is provided on the lower reach of the plurality of optical-color optically-variable pattern forming units, and configured to dry and cure the printing stock.

11. The multi-optical-color optically-variable printing device according to claim 2, wherein, the spatial light modulator further comprises a GLV modulator.

12. The multi-optical-color optically-variable printing device according to claim 2, wherein, the pre-drying and curing device comprises multiple optical mask curing devices, and the multiple optical mask curing devices are arranged at intervals in the axial direction of the magnetizing roller.

* * * * *